United States Patent
Yamamoto (10) Patent No.: US 8,681,263 B2
(45) Date of Patent: Mar. 25, 2014

(54) IMAGER CAPTURING AN IMAGE WITH A ROLLING SHUTTER USING FLICKER DETECTION

(75) Inventor: Yasuhiro Yamamoto, Tokyo (JP)

(73) Assignee: Ricoh Imaging Company, Ltd, Tokyo (JP)

( * ) Notice: Subject to any disclaimer, the term of this patent is extended or adjusted under 35 U.S.C. 154(b) by 385 days.

(21) Appl. No.: 12/649,401

(22) Filed: Dec. 30, 2009

(65) Prior Publication Data

US 2010/0171843 A1    Jul. 8, 2010

(30) Foreign Application Priority Data

Jan. 7, 2009 (JP) ................. 2009-001941

(51) Int. Cl.
*H04N 5/235* (2006.01)
*H04N 9/73* (2006.01)
*G03B 13/00* (2006.01)

(52) U.S. Cl.
USPC ......... 348/350; 348/226.1; 348/345; 348/349

(58) Field of Classification Search
None
See application file for complete search history.

(56) References Cited

U.S. PATENT DOCUMENTS

| | | | |
|---|---|---|---|
| 6,781,632 B1 * | 8/2004 | Ide | 348/345 |
| 7,496,290 B2 | 2/2009 | Nakata | |
| 7,742,695 B2 | 6/2010 | Hirose | |
| 2002/0158971 A1 * | 10/2002 | Daiku et al. | 348/226.1 |
| 2003/0090587 A1 * | 5/2003 | Hofer et al. | 348/349 |
| 2005/0174442 A1 * | 8/2005 | Yuyama | 348/226.1 |
| 2006/0055813 A1 * | 3/2006 | Nakata et al. | 348/345 |
| 2006/0120711 A1 | 6/2006 | Nakata | |
| 2006/0152598 A1 * | 7/2006 | Kawarada | 348/226.1 |
| 2006/0197846 A1 * | 9/2006 | Nose | 348/226.1 |
| 2006/0279641 A1 * | 12/2006 | Takahashi et al. | 348/226.1 |
| 2007/0046789 A1 * | 3/2007 | Kirisawa | 348/226.1 |
| 2007/0269127 A1 * | 11/2007 | Kusaka | 382/255 |
| 2007/0285532 A1 | 12/2007 | Yamamoto | |
| 2008/0024625 A1 | 1/2008 | Yamamoto | |
| 2008/0024626 A1 | 1/2008 | Yamamoto | |
| 2008/0187304 A1 | 8/2008 | Hirose | |
| 2008/0284870 A1 * | 11/2008 | Yokoi | 348/228.1 |
| 2008/0303925 A1 * | 12/2008 | Oota | 348/234 |
| 2009/0278966 A1 * | 11/2009 | Kusaka | 348/294 |
| 2010/0226640 A1 | 9/2010 | Hirose | |

FOREIGN PATENT DOCUMENTS

| | | |
|---|---|---|
| JP | 2003-244519 | 8/2003 |
| JP | 2007-329604 | 12/2007 |
| JP | 2008-113237 | 5/2008 |
| JP | 2008-153848 | 7/2008 |

(Continued)

OTHER PUBLICATIONS

U.S. Appl. No. 12/649,408 to Yamamoto, filed Dec. 30, 2009.

(Continued)

*Primary Examiner* — Twyler Haskins
*Assistant Examiner* — Dwight C Tejano
(74) *Attorney, Agent, or Firm* — Greenblum & Bernstein, P.L.C.

(57) ABSTRACT

An imager is provided having an image-capturing sensor, a focusing detector, and a flicker detector. The image-capturing sensor captures a subject image with a rolling shutter and outputs image data. The focusing detector determines whether a subject image is in focus of the image-capturing sensor using the output image data. The flicker detector detects a flicker in the output image data. The focusing detector uses horizontal data without vertical data from the image data so as to determine whether a subject image is in focus, when the flicker detector detects a flicker.

3 Claims, 6 Drawing Sheets

(56) References Cited

FOREIGN PATENT DOCUMENTS

| | | |
|---|---|---|
| JP | 2008-209900 | 9/2008 |
| JP | 2008-224808 | 9/2008 |
| JP | 2008-304809 | 12/2008 |

OTHER PUBLICATIONS

Japan Office Action, dated Sep. 25, 2012, in corresponding Japanese patent application (together with English language translation thereof).

* cited by examiner

IMAGER CAPTURING AN IMAGE WITH A ROLLING SHUTTER USING FLICKER DETECTION

BACKGROUND OF THE INVENTION

1. Field of the Invention

The present invention relates to an imager that photographs a subject with a rolling shutter.

2. Description of the Related Art

Japanese Unexamined Patent Publication (KOKAI) No. 2007-329604 discloses an image sensor that comprises photodiodes aligned on a square grid and photographs with a rolling shutter, and a contrast AF that relies on the contrast of image data output by the image sensor to determine whether a lens is focused on a subject. For examples, a CMOS image sensor is used as such an image sensor.

Meanwhile, the quality of a photographed image may be degraded by a flicker caused by a light source that changes its emitting intensity with the passage of time. For example, a fluorescent light is used as such a light source. To prevent degradation of image quality, a flicker included in a photographed image is detected.

The moment of exposure is different for each photodiode in the vertical direction because a CMOS image sensor photographs with a rolling shutter. Therefore, in the case that the intensity of a light source varies with respect to time, the amount of light received by each photodiode may be different in the vertical direction. In the case where the amount of received light differs, a contrast AF may cause interference because contrast in a photographed image is not consistent.

SUMMARY OF THE INVENTION

An object of the present invention is to provide an imager that can focus on a subject using a contrast AF procedure under flickering light conditions.

An imager is provided having an image-capturing sensor, a focusing detector, and a flicker detector. The image-capturing sensor captures a subject image with a rolling shutter and outputs image data. The focusing detector determines whether a subject image is in focus of the image-capturing sensor using the output image data. The flicker detector detects a flicker in the output image data. The focusing detector uses horizontal data without vertical data from the image data so as to determine whether a subject image is in focus, when the flicker detector detects a flicker.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
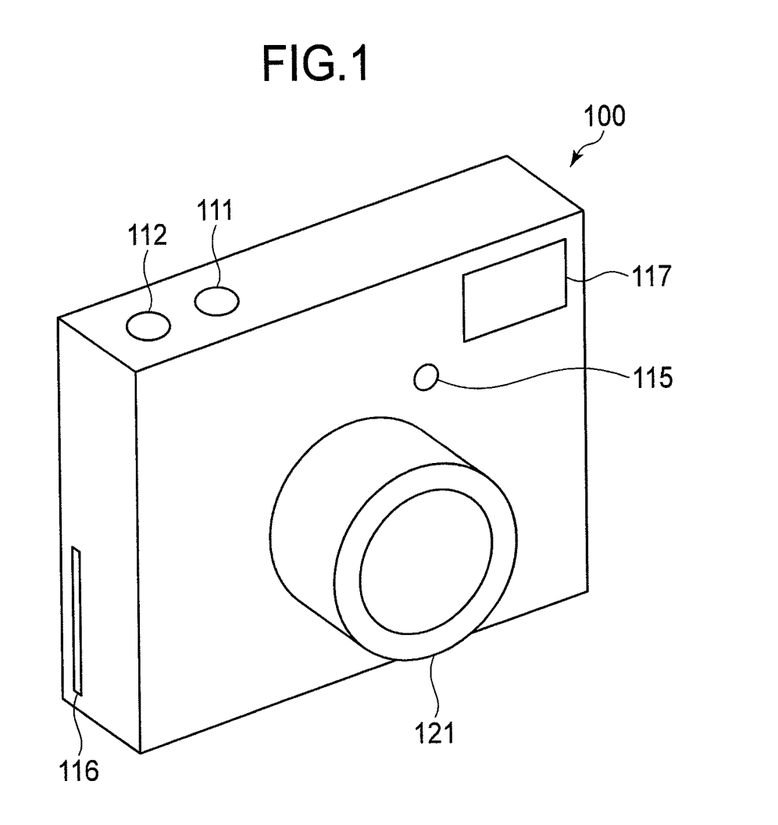
FIG. 1 is a perspective view of the back of a digital camera having the imager according to the embodiment of the present invention.
Figure 2:
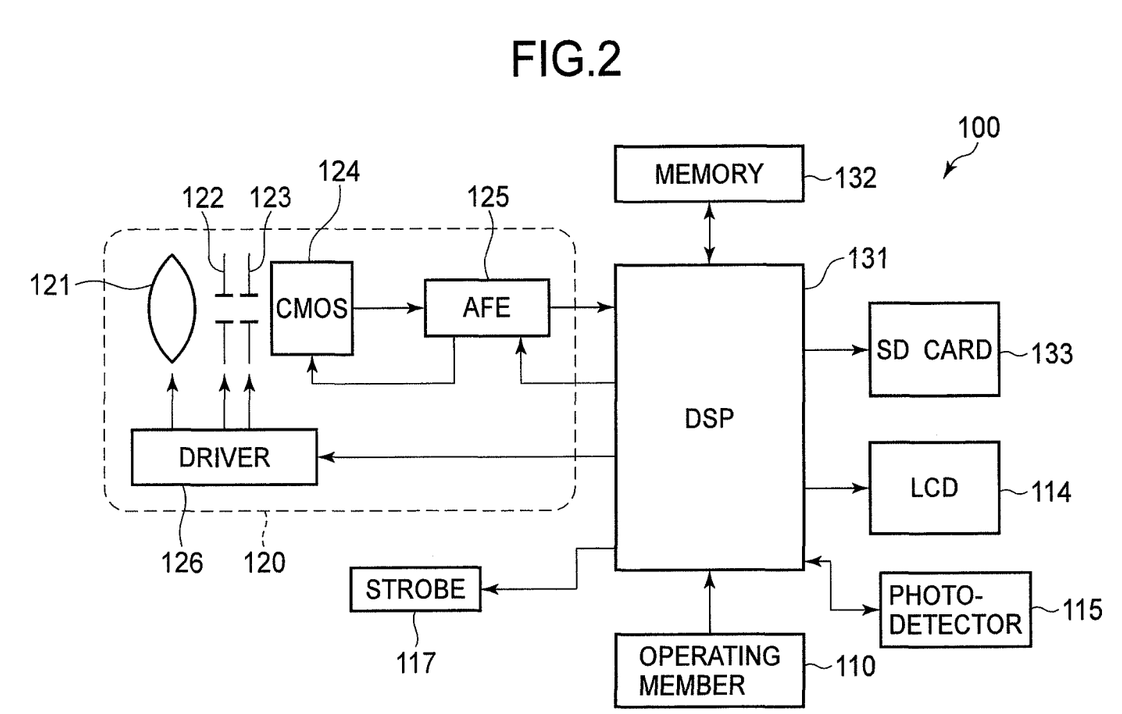
FIG. 2 is a block diagram of the digital camera.
Figure 3:
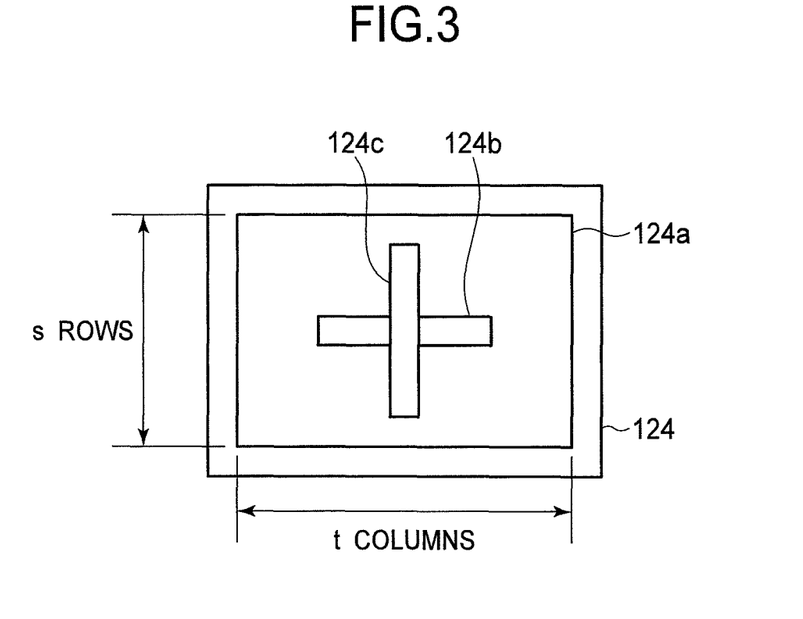
FIG. 3 is an elevated front view of an imaging area.

A digital camera 100, which is an imager according to the embodiment, is described with reference to FIGS. 1 to 3. The digital camera 100 is, for example, a compact camera.

The digital camera 100 mainly comprises a DSP 131 that controls the digital camera 100, an operating part 110 that is used to operate the digital camera 100, a photographing member 120 that converts a subject image to a digital signal, a memory 132 that stores data sent from the DSP 131, an SD card 133 that stores photographed images, an LCD 114 that displays photographing conditions and photographed images, a photo detector 115, and a strobe lamp 117.

The photographing member 120 mainly comprises a photographing lens 121, a shutter 123, an aperture 122, a CMOS image sensor 124, an AFE (Analog Front End) 125, and a driver 126 that drives the photographing Lens 121, the shutter 123, and the aperture 122.

The photographing lens 121 comprises a focusing optical system that brings a subject into focus. The driver 126 controls the position of the focusing optical system so that focus of the photographing lens 121 is adjusted and a subject image reaches the CMOS image sensor 124.

The CMOS image sensor 124 has an imaging area 124a that is used in the capture of an image. Focus of the photographing lens 121 is adjusted to form a subject image on an imaging area 124a of the CMOS image sensor 124.

The aperture 122 controls a beam of light running from the photographing lens 121 to the CMOS image sensor 124 so as to control the amount of light a subject image forms on the imaging area. The shutter 123 controls the period of time in which a subject image is exposed to the imaging area. The CMOS image sensor 124 converts a subject image that is incident on the imaging area to an analog image signal and sends it to the AFE 125. The AFE 125 adjusts the gain and other aspects of the analog image signal, converts it to a digital image signal, and then sends it to the DSP 131. The driver 126 controls the position of the focusing system, size of the aperture 122, and shutter speed according to signals received from the DSP 131.

Before photographing, the DSP 131 measures the amount of light that is incident on a subject, this information is included in the digital image signal. The DSP 131 calculates an exposure value based on the amount of light, and calculates a shutter speed and an aperture value, i.e. an F-number, using the exposure value. Afterward, it sends the shutter speed and F-number to the driver 126. Moreover, it determines the appropriate position of the focusing system based on the received digital image signal, and sends the coordinates of the appropriate position of the focusing system to the driver 126.

The DSP 131 carries out image processing on the digital image signal so as to adjust the white balance of the photographed image. The color temperature of the light source is calculated using the digital image signal.

After the DSP 131 receives the digital image signal from the AFE 125, it adjusts the white balance of the image before sending the adjusted image as a through image to the LCD 114. The through image consists of multiple still images, but it is perceived as a moving image by a user.

During photographing, the DSP 131 processes the image of a digital image signal and creates a photographic image. The photographic image is stored in the SD card 133 and displayed on the LCD 114. The memory 132 is used as a working memory and stores data temporarily when the DSP 131 executes these calculations and carries out image processing.

The plurality of photodiodes, i.e., the plurality of pixels, is organized in a matrix of s rows and t columns in the imaging area 124a. The DSP 131 provides a virtual horizontal AF area 124b and a virtual vertical AF area 124c in the imaging area 124a of the CMOS image sensor 124. The horizontal AF area 124b is provided at the center of the imaging area 124a in the vertical direction of the imaging area 124a, and has a rectangular shape extending in the longitudinal direction, i.e., the horizontal direction of the CMOS image sensor 124. The horizontal AF area 124b comprises multiple pixels forming either a single row or a plurality of rows. The vertical AF area 124c is provided at the center of the imaging area 124a in the longitudinal, i.e., horizontal direction of the imaging area 124a, and has a rectangular shape extending in the vertical direction of the CMOS image sensor 124. The vertical AF area 124c comprises multiple pixels forming either a single row or a plurality of rows. The horizontal AF area 124b orthogonally crosses the vertical AF area 124c, so that their centers overlap. The centers of imaging area 124, the horizontal AF area 124b, and the vertical AF area 124c all overlap with each other. The DSP 131 executes a contrast AF procedure that moves the focusing optical system to an in-focus position.

In the contrast AF procedure, contrast values C are calculated for all pixels located in both of the horizontal AF area 124b and vertical AF area 124c, and the in-focus position of the focusing optical system is adjusted to the position corresponding to the highest average value of the calculated contrast values.

The contrast value C is calculated based on a G signal (a green signal) value output by the CMOS image sensor 124 for a color image, and based on a luminance value output by the CMOS image sensor 124 for a monochrome image. More specifically, the following formula is used for the calculation of the contrast value Cn of pixel n using luminance P(n):

$$Cn = -P(n-1) + 2 \cdot P(n) - P(n+1)$$

The LCD 114 has a rectangular screen with an aspect ratio of 3 to 4, which is the same as a photographic image. The LCD 114 is provided on the central part of the back side of the digital camera 100, such that its longitudinal direction extends parallel to the longitudinal (left to right) direction of the digital camera 100. Images captured through the photographing lens 121, photographed images, through images, and a variety of configuration data for the digital camera can all be displayed on the LCD 114. The through image is sent from the DSP 131.

The operating member 110 has a main power button 111 and a release button 112.

The main power button 111 is a push switch projecting from the top of the digital camera 100. The digital camera 100 is powered when a user depresses the main power button 111. The digital camera 100 is powered off when a user depresses the main power button 111 while the digital camera 110 is powered.

The release button 112 is a two-stage push switch that is provided on the top surface of the digital camera 100. The digital camera 100 executes photometry, distance surveying and focusing when a user depresses the release button 112 only halfway. Otherwise, when the release button 112 is fully depressed, the digital camera 100 captures an image.

The photo detector 115 is provided on the digital camera 100 in close proximity to the photographing lens 121, and detects both color temperature and the cycle of ambient light surrounding the digital camera 100. The detected value is sent to the DSP 131.

The strobe lamp 117 is provided on the front surface of the digital camera 100 in close proximity to the photographing lens 121, and is used as an auxiliary light source during photographing.

The SD card 133 is detachably stored in a card slot 116 that is provided on the side of the digital camera 100. A user can access the SD card 133 and replace it from the outside of the digital camera 100.

Figure 4:
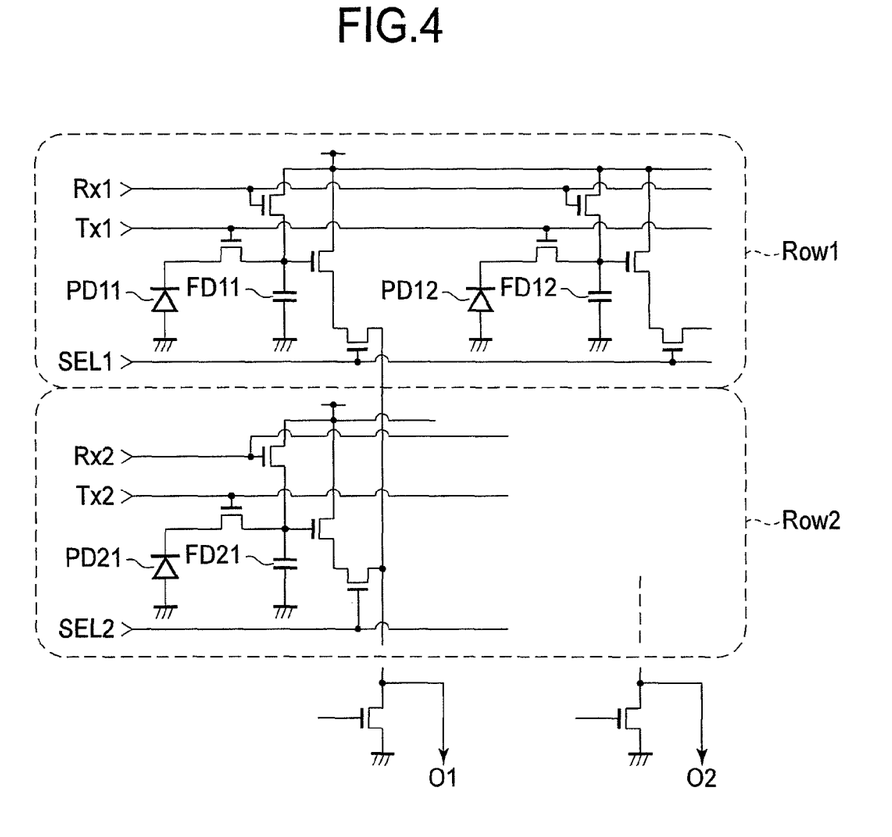
FIG. 4 is a circuit diagram of a part of a circuit provided in a CMOS image sensor.
Figure 5:
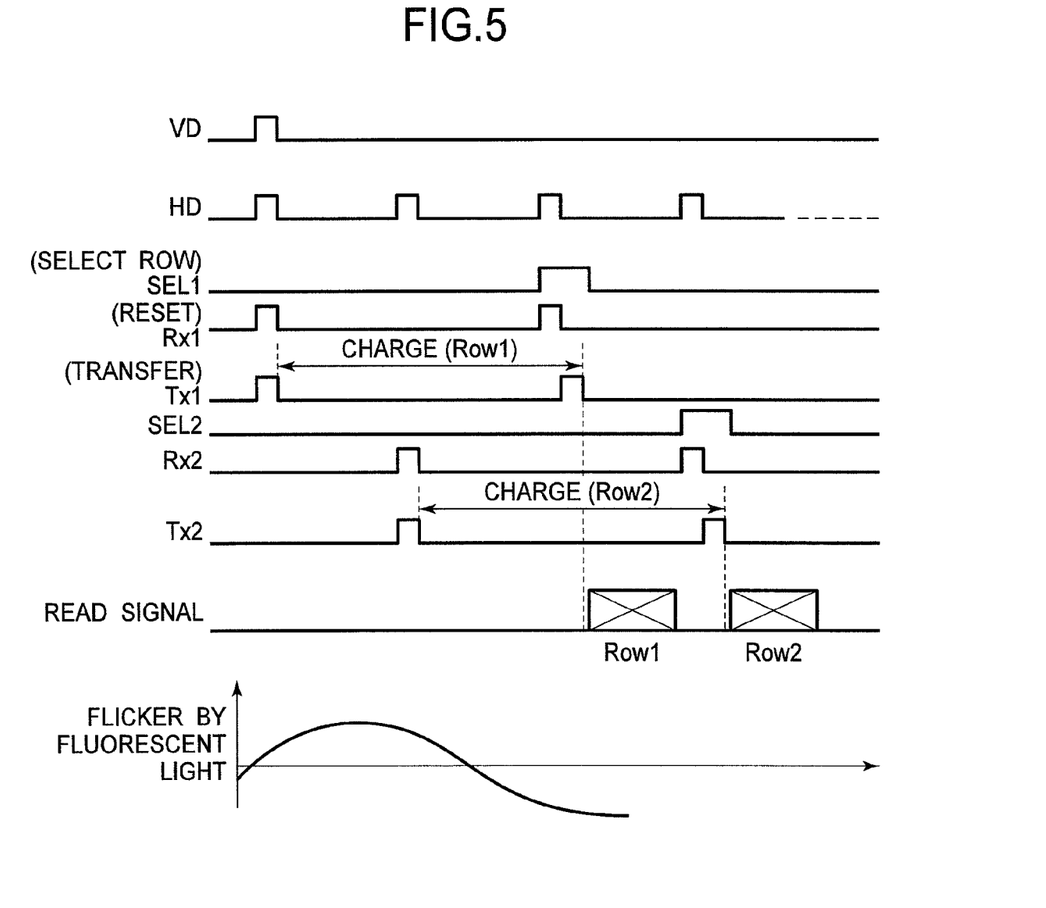
FIG. 5 is a timing diagram that shows the timing of retrieving an analog image signal from the CMOS image sensor.

The procedure of reading analog image signals from the CMOS imaging sensor 124 using the rolling shutter is described below with reference to FIGS. 4 and 5. The CMOS imaging sensor 124 comprises the circuit illustrated in FIG. 4.

The CMOS imaging sensor 124 comprises a time-signal generator (not illustrated). All of the pixels provided in the CMOS image sensor 124 are synchronized with time signals generated by the time-signal generator.

The pixels provided in the CMOS image sensor 124 have a photodiode PD, a junction capacitance FD, and a plurality of field-effect transistors (FET). The photodiode PD1i provided in the first row is connected to a first reset signal line Rx1 with an FET, a first transfer signal line Tx1, and a first select signal line SEL1. Similarly, the photodiode PDni provided in the nth row is connected to an n reset signal line Rxn with an FET, an n transfer signal line Txn, and an nth select signal line SELn. The photodiodes PDi1 provided in the first row are connected to a first output line O1 with the FETs. Similarly, the t pieces of the photodiodes PDni provided in the nth row are connected to an nth output line On with the FETs.

When the pixel signal is read from the CMOS image sensor 124, the voltage of the vertical synchronization signal line VD, the horizontal synchronization signal HD, the first reset signal line Rx1, and the first transfer signal line Tx1 are set to High at the first time signal. This procedure zeroes out both the electric charge in the first photodiode PD11 and the junction capacitance FD11. Next, the voltage of the vertical synchronization signal line VD, the horizontal synchronization signal HD, the first reset signal line Rx1, and the first transfer signal line Tx1 are set to Low. After that, when the CMOS imaging sensor 124 receives light, an electric charge begins being stored in the first photodiode PD11 according to the amount of light received. This operation is carried out for all photodiodes PD1n provided in the first row.

At the next time signal, the voltage of the horizontal synchronization signal HD, the second reset signal line Rx2, and the second transfer signal line Tx2 are set to High. This procedure zeroes out both the electric charge in the second photodiode PD21 and the junction capacitance FD21. Next, the voltage of the vertical synchronization signal line VD, the horizontal synchronization signal HD, the second reset signal line Rx2, and the second transfer signal line Tx2 are set to Low. After that, when the CMOS imaging sensor 124 receives light, an electric charge begins being stored in the second photodiode PD21 according to the amount of light received. This operation is carried out for all photodiodes PD2n provided in the second row. All of the photodiodes PDnn begin storing electric charges by executing this procedure for all rows.

At the next time signal, the voltage of the horizontal synchronization signal HD, the selecting signal SEL1 and the first reset signal line Rx1 are set to High, and the reset element is read. After a predetermined duration, the voltage of the first reset signal line Rx1 is set to Low, and the voltage of the transfer signal line Tx1 is set to High, so that the signal element can be read. The differential between the signal element and the reset element is detected using the CDS circuit (not shown) provided in the CMOS image sensor 124, so that the preparation for reading an electric charge from the first photodiode PD11 is completed. This operation is simultaneously carried out for all of the photodiodes PD1n provided in the first row.

At the next time signal, the voltage of the horizontal synchronization signal HD, the selecting signal SEL2 and the second reset signal line Rx2 are set to High, and the reset element is read. After a predetermined duration, the voltage of the second reset signal line Rx2 is set to Low, and the voltage of the transfer signal line Tx2 is set to High, so that the signal element can be read. The differential between the signal element and the reset element is detected using the CDS circuit (not shown) provided in the CMOS image sensor 124, so that the preparation for reading an electric charge from the second photodiode PD21 is completed. This operation is simultaneously carried out for all of the photodiodes PD2n provided in the second row.

The pixel signals are output from all of the photodiodes PDnn by executing these procedures for all rows. The time difference between storing the electric charges in the photodiodes PD that belong to the adjoining lines is 1HD period. The length of 1HD period extends from the moment of the High voltage of the horizontal synchronization signal HD to the High voltage of the next signal.

In the case that a fluorescent light source with emission intensity that varies with respect to time is used as a light source, the intensity of light emitted by the fluorescent light source varies until all photodiodes in the CMOS imaging sensor 124 finish outputting the electric charge. Therefore, the amount of light stored in each photodiode PD may be different in the vertical direction. In the case that the amount of light received is different, it may interfere with a contrast AF procedure and destabilize the contrast of a photographic image. To prevent this from occurring, the flicker reduction procedure, which is described hereinafter, is carried out.

Figure 6:
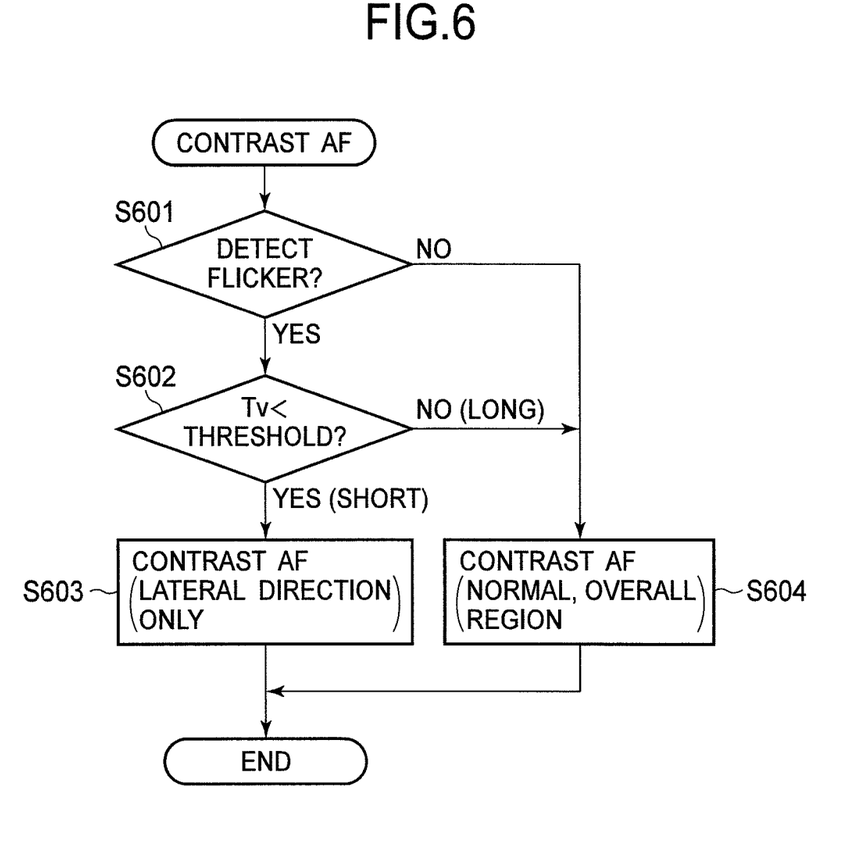
FIG. 6 is a flowchart of a flicker reduction procedure.

The flicker reduction procedure is described below with reference to FIG. 7. The flicker reduction procedure is carried out when the release button 112 is depressed halfway.

In Step S601, the DSP 131 determines whether or not a flicker is included in the digital image signal. In the case flicker is included, the procedure proceeds to Step S602 because the amount of light received by the photodiodes PD provided in each row may be different in the vertical direction. In the case flicker is not included, the procedure proceeds to Step S604.

In Step S602, it is determined whether or not a charge-storing time per one row, i.e. an elapsed time from the point when the nth transfer signal line Txn is at its Low value to the point when it is at its Low value in the next cycle, is smaller than a predetermined threshold value. The predetermined threshold value is a value that includes a sufficient number of blinking cycles, for example 50 ms, when the blinking cycle of a fluorescent light is 50 Hz. A value that includes enough blinking cycles is the amount of time necessary for the fluorescent light to blink at least once. In the case that the charge-storing time for one row is less than the predetermined threshold value, the amount of light stored in photodiode PD in each row may be different in the vertical direction. In Step S602, in the case that a charge-storing time for one row is less than the predetermined threshold value, the procedure continues to Step S603. Otherwise it is not smaller than the threshold value and the procedure proceeds to Step S604.

In Step S603, the contrast AF procedure is carried out using a contrast value C obtained from the pixels provided in the horizontal AF area 124b.

In Step S604, the contrast AF procedure is carried out using a contrast value C obtained from the pixels provided in the horizontal AF area 124b and the vertical AF area 124c.

According to these preceding steps, the contrast AF procedure can be executed without interference caused by a flicker.

According to this embodiment, the imager 100 can focus on a subject using a contrast AF procedure even under flickering light conditions.

Note that in Step S601 the DSP 131 may determine whether or not the color temperature detected by the photo detector 115 or the color temperature calculated by the DSP 131 approximates that of fluorescent light. In the case that a color temperature approximates that of fluorescent light, the procedure continues to Step S602.

In Step S601, a flicker may be detected using cycles of flickering light detected by the photo detector 115. In this case that a flicker is detected, the procedure proceeds to Step S602.

In Step S604, the contrast AF procedure may be carried out using a contrast value C that is calculated from all of the pixels in the imaging area 124a, while it may not be calculated from the pixels in the horizontal AF area 124b and the vertical AF area 124c.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2009-001941 (filed on Jan. 7, 2009), which is expressly incorporated herein, by reference, in its entirety.

The invention claimed is:

1. An imager, comprising:
an image-capturing sensor that captures a subject image with a rolling shutter and outputs image data, said image-capturing sensor including an imaging area,
wherein said imaging area includes a virtual horizontal auto-focus area that produces horizontal data, and a virtual vertical auto-focus area that produces vertical data, and
wherein said virtual horizontal auto-focus area and said virtual vertical auto-focus area overlap one another;
a focusing detector that determines whether a subject image is in focus of said image-capturing sensor using the output image data;
a light-source detector that detects what type of light that is illuminating a subject;
a light cycle detector that detects a cycle of a light that is illuminating said subject; and
a flicker detector that detects a flicker in the output image data;
wherein said flicker detector detects said flicker when the detected type of light corresponds to a certain type of light,
said focusing detector automatically uses said horizontal data, without said vertical data, from the output image data so as to determine whether a subject image is in focus, when said flicker detector detects a flicker, and
said focusing detector uses said horizontal data from the output image data so as to determine whether said subject image is in focus when a charge storing time per one row of said image-capturing sensor is shorter than a threshold time that is determined according to the light cycle detected by said light cycle detector.

2. The imager according to claim 1,
wherein said flicker detector detects said flicker when the detected light cycle corresponds to a certain type.

3. An imager, comprising:
an image-capturing sensor that captures a subject image with a rolling shutter and outputs image data, said image-capturing sensor including an imaging area, wherein said imaging area includes a virtual horizontal auto-focus area that produces horizontal data, and a virtual vertical auto-focus area that produces vertical data, and wherein said virtual horizontal auto-focus area and said virtual vertical auto-focus area overlap one another;

a focusing detector that determines whether a subject image is in focus of said image-capturing sensor using the output image data;

a light cycle detector that detects a cycle of a light that is illuminating a subject; and a flicker detector that detects a flicker in the output image data;

wherein said flicker detector detects said flicker when the detected light cycle corresponds to a certain type of light, wherein said focusing detector automatically uses said horizontal data, without said vertical data, from the output image data so as to determine whether a subject image is in focus, when said flicker detector detects a flicker, and wherein said focusing detector uses said horizontal data from the output image data so as to determine whether said subject image is in focus when a charge storing time per one row of said image-capturing sensor is shorter than a threshold time that is determined according to the light cycle detected by said light cycle detector.

* * * * *